Figure 1:
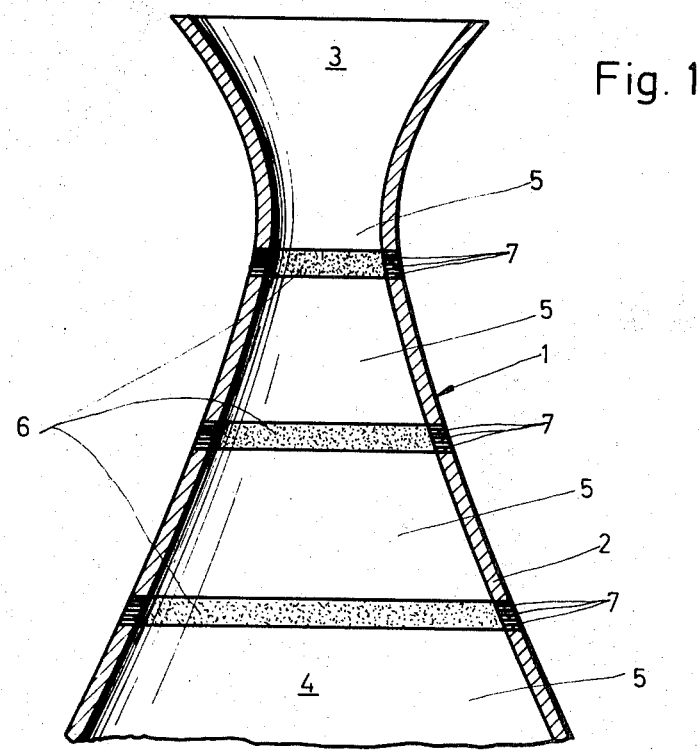

United States Patent
Kaufmann

[11] 3,712,546
[45] Jan. 23, 1973

[54] ROCKET ENGINE EXHAUST NOZZLE WITH BOUNDARY LAYER CONTROL

[75] Inventor: Michael Kaufmann, Neubiberg, Germany

[73] Assignee: Messerschmitt-Bolkow-Blohm GmbH, Munchen, Germany

[22] Filed: May 3, 1971

[21] Appl. No.: 139,397

[30] Foreign Application Priority Data

May 8, 1970 Germany..................P 20 22 517.6

[52] U.S. Cl..............................239/265.11, 60/271
[51] Int. Cl. ............................................B63h 11/00
[58] Field of Search.......239/265.11, 265.19, DIG. 7; 60/267, 271

[56] References Cited

UNITED STATES PATENTS

| | | | |
|---|---|---|---|
| 2,481,059 | 9/1949 | Africano | 60/271 |
| 3,230,705 | 1/1966 | Peterson | 60/264 X |
| 3,224,678 | 12/1965 | Rosman | 239/265.11 X |
| 3,134,224 | 5/1964 | Lippincott et al. | 60/39.07 X |
| 3,297,256 | 1/1967 | Hickerson et al. | 60/271 X |
| 3,092,963 | 6/1963 | Lawrence | 60/271 X |

FOREIGN PATENTS OR APPLICATIONS 1,273,933 9/1961 France .....................60/271

Primary Examiner—M. Henson Wood, Jr.
Assistant Examiner—Thomas C. Culp, Jr.
Attorney—Woodhams, Blanchard & Flynn

[57] ABSTRACT

An exhaust nozzle for rocket engines. A series of relief openings are provided through the wall of the exhaust nozzle, said openings being preferably arranged in circumferentially complete but axially spaced groupings. The relief openings may be provided either by making axially successive sections of the exhaust nozzle from porous material or same may be provided by machining or similar methods. The successive bands of openings tend to bleed off sufficient exhaust gas to prevent the development of turbulent flow and thereby maintain such flow in a laminar condition. This reduces the frictional energy losses otherwise tending to develop as the exhaust gases flow through the exhaust nozzle for a given expansion ratio and length thereof.

10 Claims, 3 Drawing Figures

PATENTED JAN 23 1973 3,712,546

SHEET 1 OF 2

INVENTOR
Michael Kaufmann
by Woodhams, Blanchard & Flynn
ATTORNEYS

ROCKET ENGINE EXHAUST NOZZLE WITH BOUNDARY LAYER CONTROL

The invention refers to an exhaust nozzle for rocket engines, particularly vacuum nozzle.

As is well known, the impulse efficiency of a rocket engine is defined as the square of the quotient of the actual exit velocity of the exhaust gases divided by the theoretical exit velocity of the exhaust gases. An improvement of this efficiency which depends to a considerable degree on the design and the operational conditions of the combustion chamber and exhaust nozzle can be achieved by increasing the operating pressure in the combustion chamber and by adjusting the ratio of expansion (cross section of nozzle end to cross section of nozzle throat) to the existing pressure ratio (operating pressure in the combustion chamber to ambient pressure). This will, however, affect the length of the exhaust nozzle, which for practical reasons has up to now been maintained somewhat shortened.

While the accomplishment of the last mentioned step brings about an increase in the power obtained from the specific impulse, this power increase (which is considerable, particularly for a high-pressure rocket engine intended primarily for use in vacuum conditions with a high expansion ratio) is noticeably decreased by the increase in friction acting on the stream of exhaust gas proportionate to the length of the exhaust nozzle.

It is the function of the invention to produce an exhaust nozzle of the type mentioned above which, is distinguished in comparison to conventional exhaust nozzles of the same expansion ratio and of the same length by having significantly less resistance due to friction, which can therefore be provided with a considerable expansion ratio having a predetermined resistance. This is of great technological significance for combustion chambers built for the highest operational pressures and for use in vacuum conditions.

This objective is achieved according to the invention by making the nozzle body, at least in certain sections, permeable and/or by providing it with openings extending from its inner surface to its outer surface with a very small total stream cross section in comparison to each respective exhaust nozzle cross section.

The measures taken, according to the invention, have a positive effect on the comparably small resistance due to friction of the exhaust nozzle. The quantities of exhaust gases which escape through the wall of the nozzle body which in relation to the total power output of the respective rocket engine are very small and which, therefore, represent only a very small, economically manageable loss, assure a continuous control of the boundary layers which are responsible for the loss due to friction of the stream of exhaust gas. Thus, this simple method prevents a tendency of such gases, to be converted, after flowing a certain distance, from the laminary to the considerably less advantageous — due to friction — turbulent state of flow. For that reason — as has been indicated above — exhaust nozzles can now be provided with high expansion ratios, as will make them effective in combination with a high pressure combustion chamber. Finally, there is obtained a weight reduction of nozzle bodies which are equipped with the above mentioned openings in comparison to nozzle bodies of the previously mentioned type and of like dimensions which, however, are not equipped with the openings of this invention.

In most cases, particularly with vacuum nozzles, it will be sufficient only to have the diverging exhaust nozzle section (which is usually larger than the converging exhaust nozzle section and which is, therefore, responsible for the high frictional resistance) equipped with the permeable features, and/or with openings of the above mentioned type. Such openings can have the shape of slits or can be formed by channels of randomly shaped cross sections. In the latter case, however, for reasons of an economical production for example, channels of circular cross section are usually preferred. It is recommended that the slits, channels, etc. be provided in the nozzle body in such a manner that they form one or more rows and are within each row symmetrically distributed over the respective jet circumference.

According to an additional feature of the invention, it is possible to construct the entire nozzle body, or in individual sections thereof, of either naturally porous materials or by synthetic porous materials, such latter being for example produced by electroforming methods. Such openings are thus ready-made and hence it becomes unnecessary to take additional steps to provide them in the nozzle body.

As is well known, in the flow of gas around and through a body, the conversion of the laminary boundary layer into a turbulent boundary layer will cause a substantial frictional loss in energy. This occurs at a very definite layer thickness, for the formation of which a certain distance of flow is necessary, the so-called starting distance. For this reason, it is sufficient, for the purpose of reducing the frictional loss, merely to allow media to flow out of the boundary layer at a point prior to the possible conversion of the boundary layers of the jet stream from a laminary to a turbulent condition. Thus, it is desirable to provide nozzle bodies with wall zones, which are in the axial direction alternately non-permeable and permeable and wherein the latter — as previously mentioned — can have either machined openings or can be made of porous material. An exhaust nozzle of the last mentioned type, built according to the invention, is distinguished by very small frictional resistance, and simultaneously by minimal operational loss of exhaust gases.

Further details of the invention can be seen in the schematically respresented drawings of working models with subsequent complete explanations.

Figure 2:
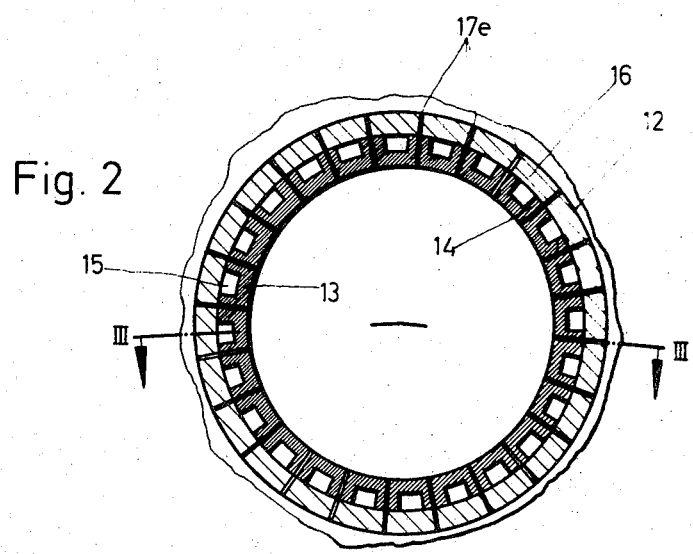
Figure 3:
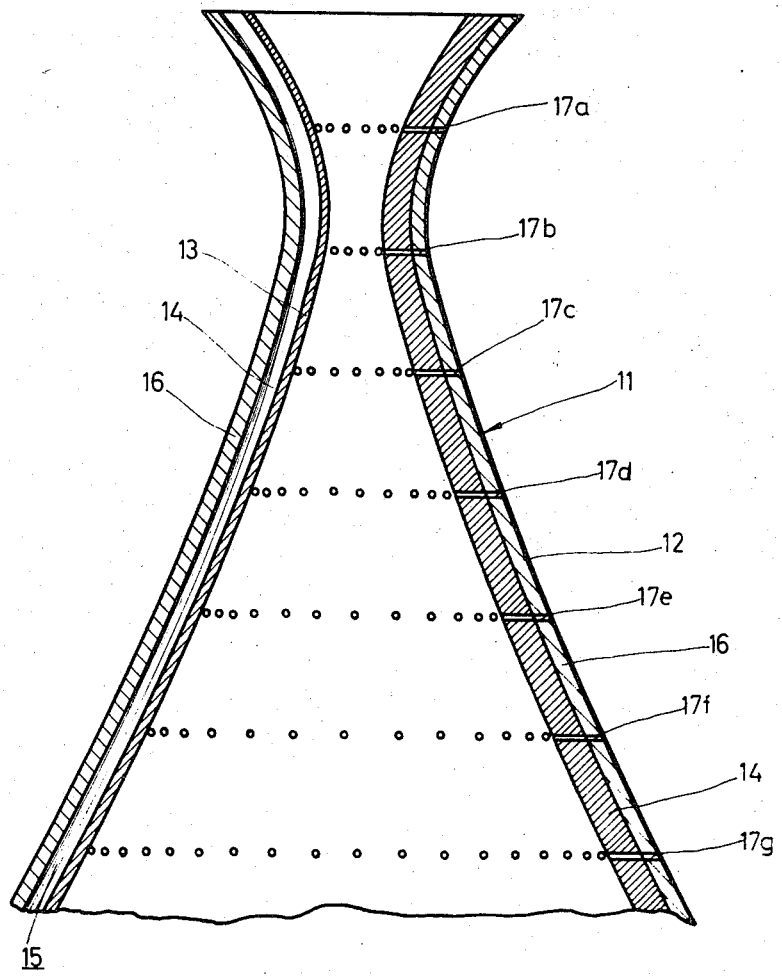

There is shown in:

FIG. 1: the lengthwise section of a portion of an embodiment of a stream-cooled exhaust nozzle, built according to the invention, FIG. 2: a cross section of a regeneratively cooled embodiment of an exhaust nozzle, built according to the invention, and FIG. 3: a lengthwise section of the exhaust nozzle according to FIG. 2, i.e., along the section line III-III.

As can be seen from FIG. 1, the illustrated stream cooled vacuum nozzle 1, which is distinguished by a high ratio of expansion (nozzle end cross section to nozzle throat cross section) of, for example, 300, is made of a single wall nozzle body 2. This nozzle body 2 shows in the input or convergent section 3 of the exhaust nozzle 1 a different construction than in the output or divergent exhaust nozzle section 4. While the nozzle body 2 in the first mentioned nozzle section 3 is made throughout impermeable to gas flow, it is in the latter nozzle section 4 made of in axial direction alternating gas impermeable wall zones 5 and wall zones 6 of porous material, the pores 7 of which form a communication between the flow chamber of the exhaust nozzle 1 and the outside thereof.

The exhaust nozzle, indicated as 11, for rocket engines, according to FIGS. 2 and 3 is of the regeneratively cooled nozzle model type. Its nozzle body 12 consists of a solid inner wall 13, into which cooling channels 15 are machined for example by milling. These cooling channels extend inwardly from the radially outlying surface, extend lengthwise of the nozzle and are separated from each other by bridges 14. They are externally covered by an exterior wall 16 produced, for example, by an electroforming method. In this embodiment, concentric rows of borings 17a–g, uniformly distributed over the respective circumferential area are applied over the entire nozzle body 12 in uniform axial distances from each other with respect to the lengthwise axis of the exhaust nozzle. The total cross section of these openings is respectively very small as compared to the entire cross section of the exhaust nozzle. These openings 17a–g go from the radial inner surface of the inner wall 13 through the bridges 14 to the radially outer surface of the exterior wall 16.

The embodiments of the invention in which an exclusive property or privilege is claimed are defined as follows:

1. An exhaust nozzle for a rocket engine, particularly a vacuum nozzle, comprising:
   first wall means defining a hollow throat nozzle section;
   second wall means defining a hollow converging nozzle section converging to a minimum diameter at said throat;
   third wall means defining a hollow diverging nozzle section diverging away from said throat, said third wall means including means defining at least one permeable section constantly permeable to gas flow during operation of said rocket engine, the cross-sectional area of said permeable section being substantially less than the corresponding cross-sectional area of said diverging nozzle section.

2. An exhaust nozzle according to claim 1, wherein said permeable section means comprises a plurality of generally radially extending passageways providing gas communication between the interior and the exterior of said diverging nozzle section.

3. An exhaust nozzle according to claim 1, wherein said second wall means includes means defining a second gas permeable section therein, said permeability providing gas communication from the interior to the exterior of said converging nozzle section.

4. An exhaust nozzle according to claim 3, wherein said second gas permeable section means comprises a plurality of generally radially extending passageways.

5. An exhaust nozzle according to claim 1, wherein said third wall means includes a plurality of concentrically extending permeable sections spaced axially along said diverging section.

6. An exhaust nozzle according to claim 5, wherein said permeable section comprises a plurality of equally spaced, generally radially extending passageways.

7. An exhaust nozzle according to claim 5, wherein said permeable section comprises an annular ring of porous material, the interior surface of which is flush with the interior surface of said diverging section.

8. An exhaust nozzle according to claim 1, wherein said third wall means comprises a gas impermeable material throughout the entire length thereof; and
   wherein said permeable section comprises a plurality of separate, generally radially extending passageways through said gas impermeable material.

9. An exhaust nozzle according to claim 8, wherein said second wall means comprises a gas impermeable material throughout the entire length thereof and includes means defining a second gas permeable section providing communication from the interior to the exterior of said converging nozzle section.

10. An exhaust nozzle according to claim 8, including means defining a plurality of circumferentially spaced, axially extending cooling channels separate from the interior and the exterior of said nozzle.

* * * * *